United States Patent [19]
Mueller

[11] 3,781,720
[45] Dec. 25, 1973

[54] AUTOMATIC TAP-GAIN INCREMENTATION OF ADAPTIVE EQUALIZERS

[75] Inventor: Kurt Hugo Mueller, Kuesnacht, Switzerland

[73] Assignee: Bell Telephone Laboratories, Inc., Murray Hill, Berkeley Heights, N.J.

[22] Filed: Jan. 4, 1973

[21] Appl. No.: 320,881

[52] U.S. Cl. .................................... 333/18, 325/42
[51] Int. Cl. ............................................ H04b 3/04
[58] Field of Search ............... 325/42; 333/18, 70 T

[56] References Cited

UNITED STATES PATENTS

| | | | |
|---|---|---|---|
| 3,609,597 | 9/1971 | Moye | 333/18 |
| 3,676,804 | 7/1972 | Mueller | 333/18 |

*Primary Examiner*—Paul L. Gensler
*Attorney*—W. L. Keefauver et al.

[57] ABSTRACT

An adaptive transversal equalizer for digital data transmission systems is improved to incorporate an automatic control for the magnitude of tap-gain incrementation adaptive to the absolute magnitude of the data error signal.

6 Claims, 4 Drawing Figures

AUTOMATIC TAP-GAIN INCREMENTATION OF ADAPTIVE EQUALIZERS

FIELD OF THE INVENTION

This invention relates generally to adaptive equalizers for synchronous digital data transmission systems and in particular to the adaptive control of the magnitude of increments iteratively applied to tap-gain circuits for such equalizers.

BACKGROUND OF THE INVENTION

The transversal time-domain equalizer is an important example of an adaptive control which is coming into extensive use in digital data transmission systems to compensate for both delay and amplitude distortion occasioned in voice-grade telephone lines. Such distortion compensation facilitates the transmission of digital data at relatively high speeds. In the transversal equalizer a plurality of synchronously time-spaced samples of a received data signal are selectively attenuated and combined to form an output in which leading and lagging echoes of the received signal are balanced against one another. Intersymbol interference is thus effectively eliminated.

In a paper entitled "A Simple Adaptive Equalizer for Efficient Data Transmission" (*Institute of Electrical and Electronic Engineers Transactions on Communication Technology*, Vol. Com-18, No. 1, pages 5 through 12; Feb. 1970), D. Hirsch and W. J. Wolf summarize the state of the automatic equalizer art. Among the topics discussed in this paper are tap adjustment algorithms. The most efficient and economical algorithm to implement was found to be the modified zero-forcing algorithm, which is based on a correlation of the polarities of consecutive signal samples with successive error polarities. In accordance with these correlations, which are spread out in time so that each error polarity is correlated with a simultaneous plurality of stored signal polarities, incremental tap-gain adjustments are iteratively made to reduce the contribution of each tap output to the error. The magnitude of the increment is held constant except for an arbitrary gear-shift change between start and run states of the equalizer. In genera a relatively large increment is employed during set-up before message data is transmitted. A much smaller increment is favored during message data transmission. The large increment decreases the settling time, i.e., time to achieve convergence, during start up. However, the maintenance of the large increment during the message period causes disturbing fluctuations in the recovered signal. On the other hand, the small increment chosen for message transmission needlessly extends the settling time, if used during start up.

It is an object of this invention to conform the magnitude of the tap-gain incrementation in a transversal equalizer for a digital data transmission system to that of the error signal.

It is another object of this invention to render the magnitude of the tap-gain adjustment in a transversal equalizer for digital data transmission as well as the direction of the incrementation adaptive to changing conditions in the transmission channel.

It is still another object of this invention to speed up the convergence time for transversal equalizers in digital data transmission systems.

SUMMARY OF THE INVENTION

According to this invention, the above and other objects are accomplished by generating a control signal common to all taps on a transversal equalizer in a receiver for a digital data transmission system from the absolute magnitude of the error signal obtained by comparing actual output samples from the equalizer with assumed reference levels and setting the magnitude of tap-gain increments at all taps proportional to the error magnitude. Further, in accordance with this invention the maximum tap-gain adjustment is limited to a predetermined value to avoid overlapping adjacent time slots.

In an illustrative embodiment of this invention the absolute error magnitude is obtained by full-wave rectification of the error difference between the analog equalizer output and the nearest permissible discrete level and the control signal is a constant level pulse whose width in time is proportional to the error magnitude. The control signal determines the charging time during each symbol interval for an integrating capacitor in each tap-gain circuit. At the same time the polarity of the error signal after correlation with the signal polarity determines the direction of the charge. In this manner both the magnitude and direction of tap-gain incrementation of a transversal equalizer are made adaptive to the time-varying characteristics of a distorting transmission channel.

A feature of this invention is the achievement of faster convergence in a transversal equalizer with minimum modification of a known tap-gain adjustment circuit.

Another feature is that a common integrable pulse-width modulator provides tap-incrementation control to all taps simultaneously.

Still another feature relates to the inclusion of a nonlinear limiter for very large error magnitudes to avoid overlapping between adjacent symbol intervals.

DESCRIPTION OF THE DRAWING

The above and other objects and features of this invention will be more fully appreciated from a consideration of the following detailed description and the drawing in which.

DETAILED DESCRIPTION

The tap-gain updating adjustment algorithm for forcing zeroes in the impulse response of a transmission channel for synchronous digital data as expounded by Hirsch and Wolf in their above-mentioned paper can be expressed $$c_{m+1}^{L} = c_m^{L} - \beta\, sgn(e_m)\, sgn(x_{m-L}) \quad (1)$$

where $c_{m+1}{}^{l}$ = the tap-gain setting of the Lth tap at the $(m+1)$th symbol interval being determined;
$c_m{}^L$ = the existing mth tap-gain setting of the Lth tap;
$\beta$ = step size of tap-gain increment;
$sgn\ (e_m)$ = present error polarity (at mth symbol interval);
$sgn\ (x_{m-L})$ = signal polarity of Lth tap; and
$L$ = tap index assuming positive and negative values.

According to this algorithm, the tap-gain at each Lth tap is incremented by the amount $\beta$ in a direction opposite to the cross correlation of the instant error polarity and the signal polarity corresponging to the tap whose gain is being adjusted. The value $\beta$ is maintained at an arbitrary constant level small enough to avoid perturbing the received message signal unduly and at the same time to allow incrementation at each symbol interval without resorting to averaging over many symbol intervals. The only contemplated change in $\beta$ is that made during start up before message data is transmitted. The smaller $\beta$ is chosen, the longer is the settling time for arriving at an acceptable eye pattern opening.

According to this invention the value of $\beta$ is made adaptive to error magnitude, thereby eliminating the need for an arbitrary gear-shift in step size of tap incrementation between start and run conditions of transversal equalizer operation.

Equation (1) can be rewritten with $\beta$ replaced by the absolute magnitude of the error magnitude $e_m$. Thus, a modified algorithm becomes $$c_{m+1}{}^L = c_m{}^L - k\,|e_m|\,sgn(e_m)sgn(x_{m-L}), \tag{2}$$

where $k$ = a positive proportionality factor constrained to be less than unity.

Figure 1:
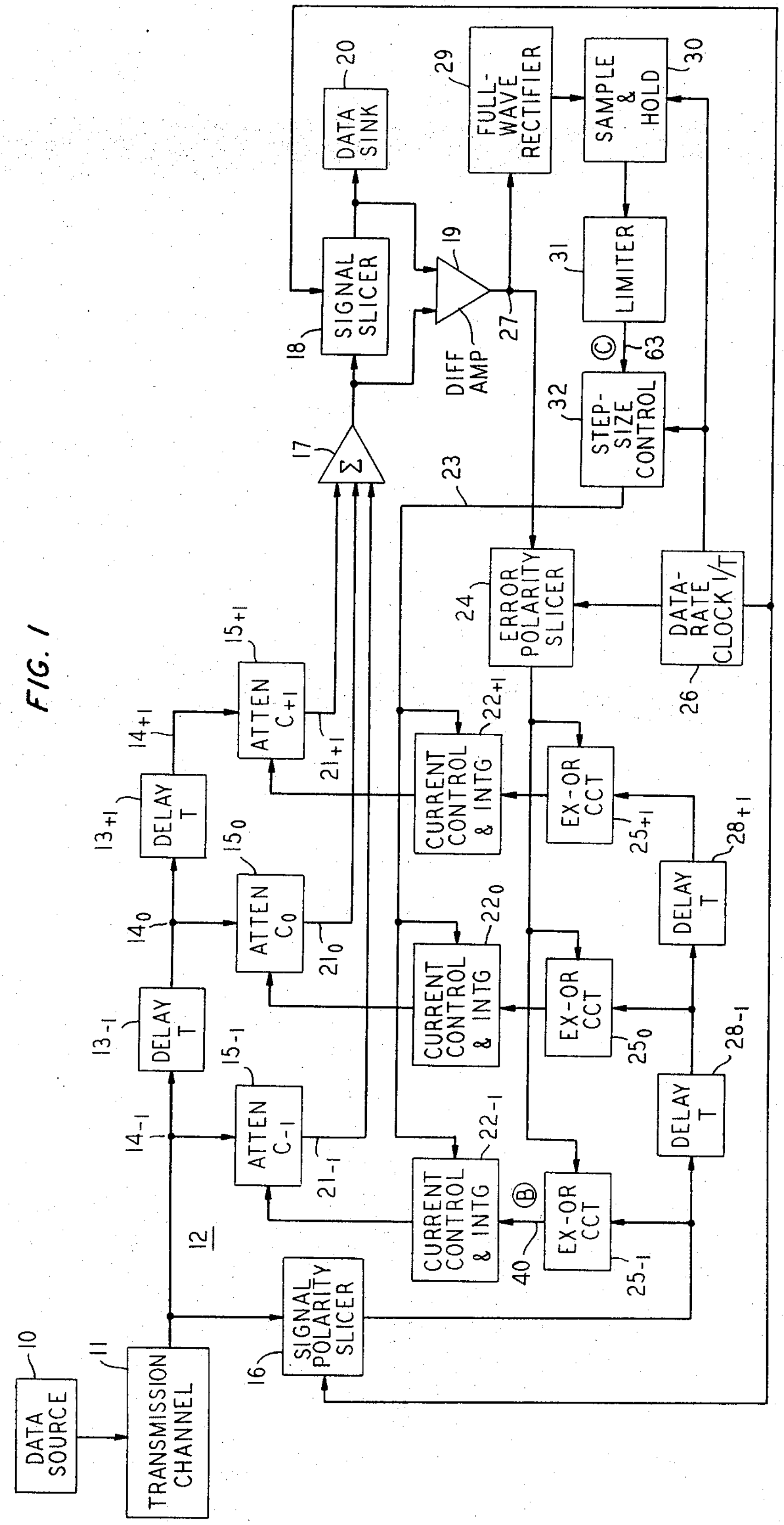
FIG. 1 is a schematic block diagram of a transversal equalizer for a digital data transmission system modified according to this invention for adaptive control of tap-gain incrementation magnitude.

FIG. 1 illustrates a synchronous digital data transmission system incorporating an automatic adaptive transversal equalizer of the modified zero-forcing type described in the above-mentioned Hirsch et al paper, as improved in accordance with this invention. A representative data transmission system comprises a data source 10, transmission channel 11 and data sink 20. The object of the system is to transfer digital data originating at source 10 over channel 11 to sink 20 with minimum error due to such channel perturbations as noise and amplitude and phase distortion with frequency. The distortion characteristics of channel 11 are determinative of the feasible transmission rate that can be maintained by the system in the face of the intersymbol interference. The process of compensating for the distortions introduced by channel 11 is called equalization. With equalization it becomes possible to increase the transmission rate by several times while minimizing intersymbol interference.

Transversal equalizer 12 in its unmodified state comprises first and second delay lines having respective analog delay units 13 and digital delay units 28, a plurality of adjustable attenuators 15 associated with individual ones of taps 14, a plurality of correlators 25 also associated with individual taps 14, a combining circuit 17 for the outputs of attenuators 15, a signal polarity slicer 16 for deriving the polarity of each received data symbol, an output signal slicer 18 for quantizing the signal output of combining circuit 17, a differential amplifier 19 for deriving an error signal from the difference between the actual output of combining circuit 17 and the quantized decision output of slicer 18, error polarity slicer 24 for furnishing a common error polarity signal to correlators 25, and data-rate clock 26. Delay units 13 are identified as analog units to accommodate multilevel received signals. Delay units 28 can be shift registers timed by clock 26 because the sliced signal polarity is binary in nature. Only two each of delay units 13 and 28 with a total of three taps are shown for each delay line for simplicity of presentation. In practice any number (usually odd) of taps can be used as necessary to achieve a desired degree of compensation.

In operation the adaptive equalizer combines a plurality of received signal samples displaced from each other at T-second intervals and appearing at taps 14 by factors represented by tap-gain coefficients C realized in attenuators 15, slices the combined signals at synchronous sampling instants determined by clock 26, subtracts the analog input of signal slicer 18 from the digital output thereof to obtain an error signal at terminal 27 of differential amplifier 19, slices the analog error signal to obtain its polarity in slicer 24, correlates the error polarity signal with each signal polarity obtained from slicer 16 and temporarily stored in delay units 28, and finally employs the correlated polarities to adjust attenuators 15 incrementally by preset amounts. A more detailed description can be found in the Hirsch et al paper.

A preferred embodiment for attenuators 15 employs field-effect transistors in a bridge circuit as disclosed in U. S. Pat. No. 3,475,601 issued to E. Port on Oct. 28, 1969. The bridge circuit in the output of the field-effect transistor permits the attainment of positive, zero and negative tap-gain factors.

According to this invention, the nature of the control input to the analog multiplier disclosed by Port is modified to incorporate current control and integrator blocks 22 between the output of each correlator 25 and a corresponding attenuator 15, which comprises the field-effect transistor and its bridge circuit. Current controls 22 are in turn made responsive to step-size control 32 and limiter 31. The complete step-size control arrangement further comprises full-wave rectifier 29 and sample and hold circuit 30. Full-wave rectifier 29 in FIG. 1 is driven by the error signal at output terminal 27 of differential amplifier 19 to obtain an absolute value for the bipolar error signal in an obvious manner. Sample and hold circuit 30 responsive to the output of rectifier 29 retains the samples value for the duration of a symbol interval T in a conventional manner. It will be apparent to one skilled in the art that the relative positions of rectifier 29 and hold circuit 30 can be interchanged without any alteration in function.

Figure 2:
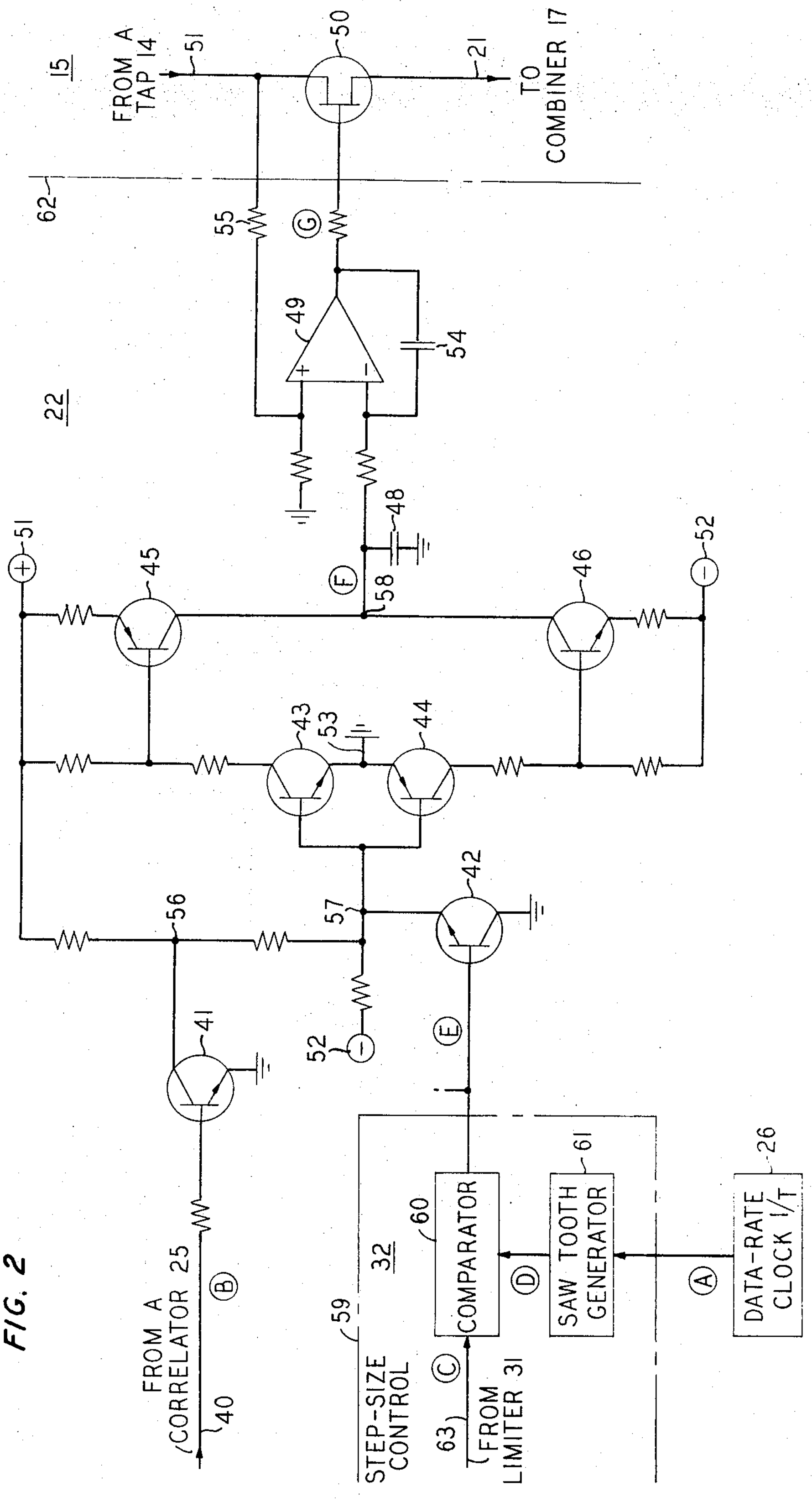
FIG. 2 is a schematic diagram of a tap-gain circuit for a transversal equalizer modified according to this invention to vary step size adaptively.

A detailed schematic diagram of current-control and integrator 22 is shown in FIG. 2. Broken line 62 divides the contents of block 22 from field-effect transistor 50 in an attenuator block 15. A current control 22 is provided for each tap 14. The portion of FIG. 2 to the left of broken line 59 is step-size control 32, which is common to all tap circuits.

The current control proper comprises input buffer npn transistor 41, a first complementary switch transistor pair including npn transistor 43 and pnp transistor 44, a second complementary transistor pair including pnp transistor 45 and npn transistor 46, clamping npn transistor 42, charging capacitor 48, and operational amplifier 49 including feedback capacitor 54. Positive and negative potential sources are further indicated by encircled plus and minus signs 51 and 52. The unmarked resistors shown serve conventional load and voltage dividing purposes.

The input to current control 22 is provided on input lead 40 from a correlator 25 and is either discretely positive or negative to turn transistor 41 on or off and thereby to place junction 56 respectively either at ground potential or at a positive potential. Junction 57 correspondingly becomes negative or positive in opposition to the polarity of the input on lead 40 to implement the minus sign in equation (2). Transistors 43 and 44 are turned respectively on and off in accordance with the potential at junction 57. The emitter electrodes of transistors 43 and 44 are grounded at junction 53. Their collector electrodes are returned to respective positive and negative potential sources 51 and 52 as indicated in FIG. 2.

Transistors 45 and 46 have their emitter electrodes returned to positive and negative potential sources 51 and 52, their collector electrodes to a common junction 58 and their base electrodes to the collector circuits of transistors 43 and 44. Accordingly, transistors 45 and 46 effectively follow transistors 43 and 44 and cause junction 58 to be respectively positive or negative in equal amounts. Since integrating capacitor 48 is connected to ground from junction 58, it charges selectively in positive and negative directions.

Looking back to the left-hand corner of FIG. 2, one sees comparator 60 having a first input on lead 63 from limiter 31 in FIG. 1 and a second input from sawtooth generator 61, which is synchronized with data-rate clock 26 (repeated from FIG. 1). Sawtooth generator 61 and comparator 60 operate as a pulse-width modulator to produce a time-modulated output whose duration is proportional to the amplitude of the input on lead 63. This output is applied to the base electrode of clamping transistor 42, whose collector electrode is grounded and whose emitter electrode is connected to junction 57. Because clamping transistor 42 is an npn type, junction 57 is grounded whenever the output of comparator 60 is positive. However, the negative excursions of the output of comparator 60 are proportional in duration to the error magnitude.

The combined effect of clamping transistor 42 and the switching transistors 43 through 46 controlled by each correlator output is to charge capacitor 48 in a direction determined by a correlator output and for a duration during each symbol interval determined by the error magnitude.

Figure 3:
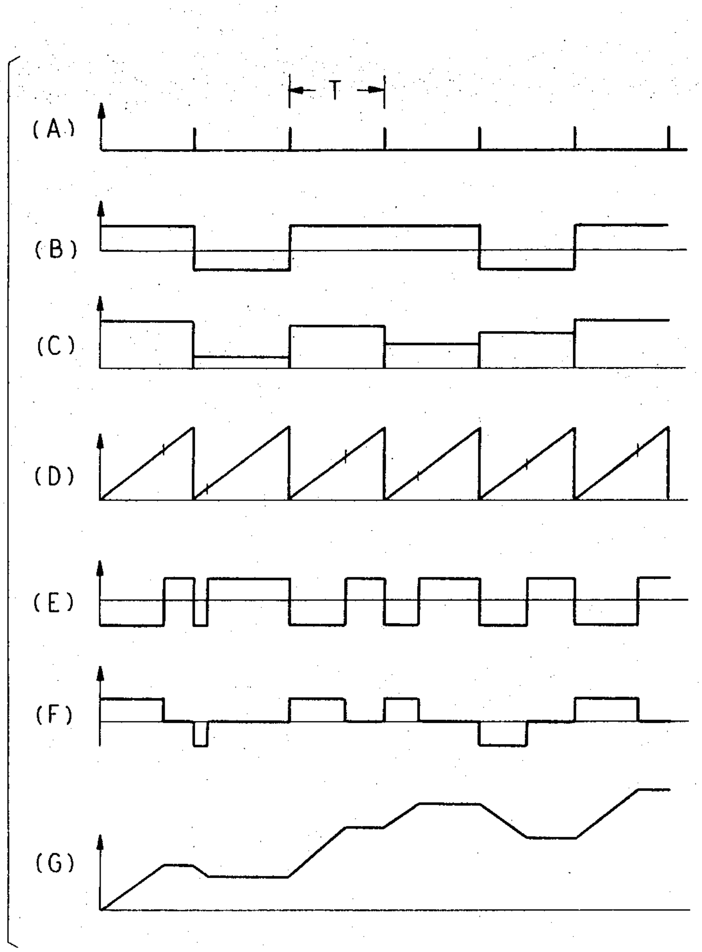
FIG. 3 is a waveform diagram helpful in explaining the operation of this invention.

Waveforms A through G in FIG. 3 and keyed on FIGS. 1 and 2 to the circuit location of their occurrence make the operation of the automatic tap-gain incrementation arrangement of this invention apparent. The ordinates in FIG. 3 are response amplitude and the abscissae are time. Waveform A, obtained in a conventional manner from received signal transitions, represents a series of synchronous timing pulses emitted by data-rate clock 26. Waveform B is a representative bipolar output of a correlator 25 in an arbitrary tap circuit. Waveform C is a representative error magnitude signal appearing at the input to step-size control 32. Waveform D is a synchronous linear sawtooth wave generated in step-size control 32. The ticks on the waveform correspond to the times of occurrence of the amplitudes of the error magnitudes of error waveforms C, as measured by comparator 60. Waveform E is the bipolar output of comparator 60, the negative portions of which are proportional to the error magnitude shown in waveform C.

Capacitor 48 is repeatedly charged in either a positive or negative direction in accordance with waveform F. Operational amplifier 49, having an inverting input connected to follow the charge state of capacitor 48, by reason of feedback capacitor 54 integrates the potentials of capacitor 48 to produce waveform G. The sloped portions of waveform G correspond to the charging or discharging of capacitor 48. The flat portions occur when clamping transistor 42 is on. The noninverting input of operational amplifier 49 receives a portion of the tap signal across resistor 55 to assist in linearizing field-effect transistor 50 on whose gate electrode the integrated output of operational amplifier 49 is incident. Field-effect transistor 50 acts as a controlled variable impedance for tap signals as explained more fully in the cited Port patent.

Figure 4:
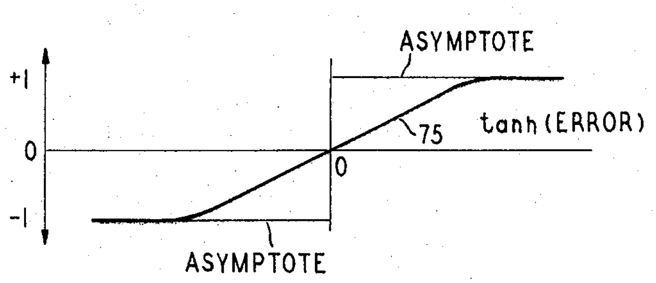
FIG. 4 is a diagram of a nonlinear limiter characteristic advantageously employed in this invention.

FIG. 4 represents a desirable characteristic for limiter 31 in FIG. 1 to preclude excessive error magnitudes which might otherwise exceed the maximum amplitude of sawtooth waveform D. The characteristic 75 resembles the graph of the hyperbolic tangent (tanh) which has an extended linear portion spanning unity positive and negative asymptotes. This characteristic is readily obtained with selected diodes. With the effect of limiter 31 included the factor $|e_m|\mathrm{sgn}(e_m)$ in equation (2) can be replaced by tanh $(e_m)$. Thus, $$c_{m+1}{}^L = c_m{}^L - k \tanh(e_m) sgn(x_{m-L}) \quad (3)$$

Equation (3) is the algorithm realized by the tap-gain incrementation control arrangement of this invention.

While this invention has been described in connection with a single illustrative embodiment, its principles are susceptible of much wider application as will be apparent to one skilled in the equalizer art.

What is claimed is:

1. In combination with a transversal equalizer for a digital data receiver including a synchronously tapped delay line, an adjustable attenuator at each tap on such delay line, a summation circuit for tap signals traversing all such attenuators, and an error signal generator connected to such summation circuit:

an automatic control circuit for attenuator incrementation comprising rectifying means for said error signal to obtain the absolute magnitude thereof, a step-size determining circuit driven by said rectifying means for producing a control signal proportional to the absolute value of said error signal, and means for applying said control signal to all of said attenuators in common to obtain attenuator increments proportional to said error signal.

2. The combination defined in claim 1 in which said step-size determining circuit is a pulse-width modulator having an output proportional in duration to the amplitude of its input.

3. The combination defined in claim 2 in which a limiter circuit, whose transfer characteristic is substantially that defined by the hyperbolic tangent (tanh) of its input, is connected in series with the input of said pulse-width modulator.

4. The combination defined in claim 2 in which said pulse-width modulator comprises a sawtooth wave generator and an amplitude comparator responsive to said sawtooth wave generator and to a signal of variable amplitude for deriving output pulses whose duration is determined by the time required for each cycle of the sawtooth wave to attain the level of the signal of variable amplitude.

5. The combination defined in claim 1 in which said step-size determining circuit further comprises for each tap circuit bilateral switching means responsive to a correlation of said error signal and the polarity of received signals at synchronous instants, a clamp circuit whose off-time is proportional to the absolute magnitude of said error signal, and integrating means jointly responsive to said switching means and said clamp circuit, the output of said integrating means constituting said control signal.

6. The combination defined in claim 5 in which said integrating means comprises a capacitor chargeable in a positive or negative direction in acccordance with the binary state of said switching means and for a duration proportional to the on-time of said clamp circuit and an operational amplifier driven by the charge on said capacitor for integrating the cumulative charge thereon.

* * * * *